ns Patent [19]

[11] 4,241,026
[45] Dec. 23, 1980

Yan

[54] ION EXCHANGE PROCESS FOR THE RECOVERY OF URANIUM

[75] Inventor: Tsoung-yuan Yan, Philadelphia, Pa.

[73] Assignee: Mobil Oil Corporation, New York, N.Y.

[21] Appl. No.: 961,438

[22] Filed: Nov. 16, 1978

[51] Int. Cl.$^2$ .............................................. C01G 43/02
[52] U.S. Cl. ............................................ 423/7; 299/5
[58] Field of Search ................. 166/268; 299/5; 423/7

[56] References Cited

U.S. PATENT DOCUMENTS

| 2,559,529 | 7/1951 | Bauman et al. | 210/37 R |
| 2,614,099 | 10/1952 | Bauman et al. | 521/32 |
| 2,841,468 | 7/1958 | Wilson | 423/7 |
| 4,155,982 | 5/1979 | Hunkin et al. | 299/5 X |

OTHER PUBLICATIONS

Wheaton et al., "Properties of Strongly Basic Anion Exchange Resins", Industrial and Engineering Chemistry, May 1951, pp. 1088 to 1093.

Dowex: Ion Exchange, The Dow Chemical Co., 1958, 1959, pp. 4 and 5.

Merritt, The Extractive Metallurgy of Uranium, Colorado School of Mines Research Institute, 1971, pp. 138 to 156.

Primary Examiner—Leland A. Sebastian
Attorney, Agent, or Firm—C. A. Huggett; William D. Jackson

[57] ABSTRACT

An ion exchange process for the recovery of uranium from a pregnant lixiviant employed in uranium leaching operations in which the lixiviant contains chloride ions inhibiting the adsorption of uranyl ions. The ion exchange resin employed to adsorb uranium from the lixiviant has cationic adsorption sites provided by quaternary ammonium groups having a hydroxyalkyl group as a quaternizing substituent. Through the use of a resin of this type, the resin loading in the presence of chloride ions is materially increased.

6 Claims, 2 Drawing Figures

ION EXCHANGE PROCESS FOR THE RECOVERY OF URANIUM

BACKGROUND OF THE INVENTION

This invention relates to the production of uranium and more particularly to the recovery of uranium from saline lixiviants by ion exchange adsorption.

Uranium is produced from uranium-bearing ores by various procedures which employ an alkaline or acid lixiviant to leach the uranium from its accompanying gangue material. Typically, the alkaline lixiviants contain alkali metal or ammonium carbonates or bicarbonates or mixtures thereof which function to solubilize hexavalent uranium in the ore as anionic uranyl complexes such as uranyl tricarbonate ions. The pH of the lixiviant normally is within the range of about 8 to 10. The acid lixiviants usually are formulated with sulfuric acid which solubilizes hexavalent uranium as complex uranyl sulfate anions. The sulfuric acid normally is used in a concentration to maintain a pH between about 0.5 to 2.0.

The leaching operation may be carried out in conjunction with surface milling operations in which uranium ore obtained by mining is crushed and blended prior to leaching, heap leaching of ore piles at the surface of the earth, or in-situ leaching in which the lixiviant is introduced into a subterranean ore deposit and then withdrawn to the surface. Regardless of the leaching operation employed, the pregnant lixiviant is then treated in order to recover the uranium therefrom. One conventional uranium recovery process involves passing the pregnant lixiviant over an anionic ion exchange resin and then eluting the resin with a suitable eluant to desorb the uranium from the resin. The resulting eluate is then treated to precipitate uranium therefrom to produce the familiar "yellowcake."

The anion exchange resins employed for uranium concentration are characterized by fixed cationic adsorption sites in which the mobile anion, typically chloride or another halide, is exchanged by the uranyl complex anion. Such anionic ion exchange resins are disclosed, for example, in Merritt, R. C., THE EXTRACTIVE METALLURGY OF URANIUM, Colorado School of Mines Research Institute, 1971, pp. 138-147. Suitable anionic ion exchange resins may take the form of polymers or copolymers of styrene substituted with quaternary ammonium groups or polymers or copolymers of pyridine which are quaternized to form pyridinium groups.

The adsorption of uranium from acid and carbonate solutions is described by Merritt at pages 147-156 where it is recognized that the presence of inorganic salts in the pregnant lixiviant tends to reduce adsorption of uranium by the anion exchange resin. Thus, Merritt discloses at pages 147, 148, and 152 that high chloride ion concentrations tend to reduce the adsorption of uranium by the resin and thus result in decreased resin loading.

SUMMARY OF THE INVENTION

The present invention provides a new and improved process for the recovery of uranium employing an anionic ion exchange resin for the adsorption of uranium from a pregnant lixiviant containing chloride ions which inhibit the adsorption of uranyl ions. In accordance with the present invention, the anionic ion exchange resin employed to adsorb uranium from the lixiviant comprises cationic adsorption sites provided by quaternary ammonium groups having a hydroxyalkyl group as a quaternizing substituent. In a specific embodiment of the invention, the cationic adsorption sites are provided by methylene hydroxyalkyldimethylammonium groups in which the hydroxyalkyl radical contains one or two carbon atoms.

DESCRIPTION OF SPECIFIC EMBODIMENTS

Figure 1:
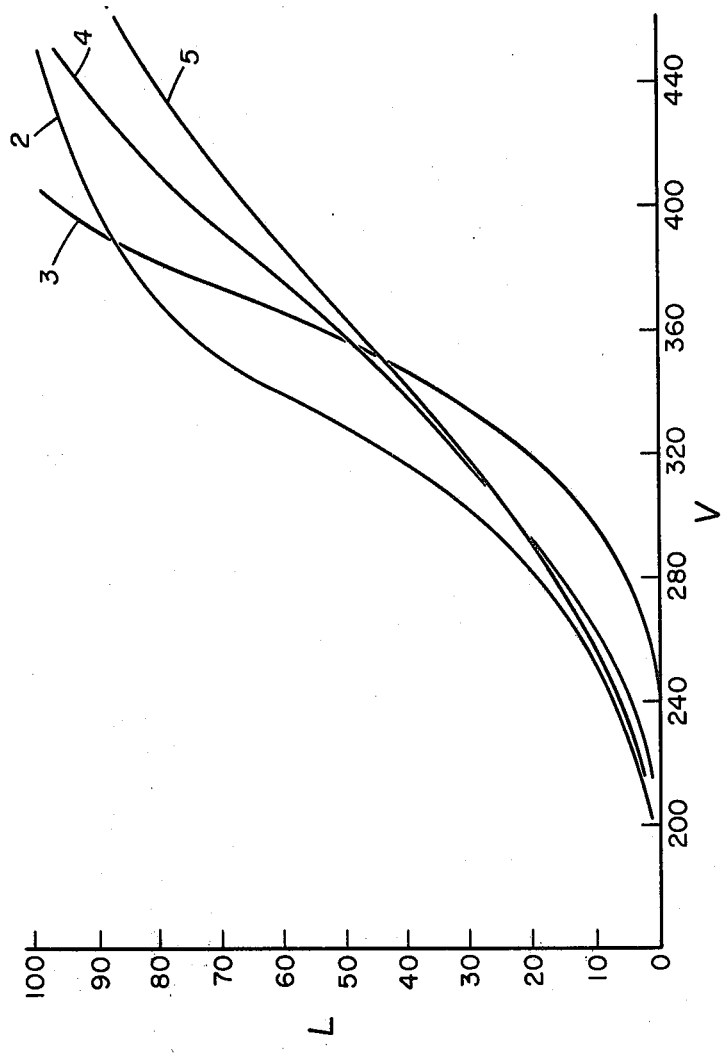
FIG. 1 is a graph illustrating the loading of certain ion exchange resins with pregnant lixiviants of a relatively low chloride ion concentration.

As noted previously, it is recognized in the uranium extraction art that chloride ions tend to compete with uranyl ions for adsorption sites on the ion exchange resins employed for uranium concentration. Chloride ions have a particularly strong inhibiting effect on the adsorption of uranyl ions from carbonate lixiviants. Thus, the aforementioned book by Merritt discloses at page 152 that an increase in chloride concentration from zero to 0.4 weight percent results in a decrease in resin loading of about 40 percent. A similar inhibiting effect, although less pronounced, exists on the adsorption of uranyl ions from sulfuric acid lixiviants.

The anionic ion exchange resins commonly employed for both carbonate and acid lixiviants are the so-called "type I" resins in which the adsorption sites are provided by quaternary ammonium groups in which all of the quaternizing substituents are alkyl groups, normally methyl groups. The type I resins may be prepared by chloromethylation of the base polyaryl polymer and subsequent reaction with a tertiary amine such as trimethyl amine. The present invention involves the use of so-called "type II" resins to concentrate uranium from lixiviants containing chloride ions which inhibit the adsorption of uranyl ions. As evidenced by the experimental data presented hereinafter, the use of the type II resins under these conditions significantly increases the attainable resin loading. The type II resins are characterized by having cationic adsorption sites provided by quaternary ammonium groups having a hydroxyalkyl group as a quaternizing substituent. Typically the cationic adsorption sites for type II resins take the form of methylene hydroxyalkyldimethylammonium groups in which the hydroxyalkyl group contains one or two carbon atoms. The type II resins may be prepared by reaction of the chloromethylated base polymer with a tertiary amine such as dimethylethanolamine or dimethylmethanolamine. For a further description of type I and type II resins, reference is made to Dowex: ION Exchange, The Dow Chemical Company, Midland, Mich. (1958, 1959), and specifically the section entitled "Strong Base Resins" found in pages 4 and 5. As indicated there, a commercially available type II resin is Dowex 2 in which the cationic adsorption sites are provided by methylene hydroxyethyldimethylammonium groups. Other commercially available type II ion exchange resins include Duolite 102D available from the Diamond Shamrock Chemical Company, Ionac A-550 and Ionac A-651 available from Ionac Chemical Company, and IRA 410 and IRA 910 available from the Rohm & Haas Company. In each of these resins, the resin network is formed of copolymers of styrene and divinylbenzene having various degrees of crosslinking and the cationic functional groups are provided by methylene hydroxyethyldimethylammonium groups, similarly as in the case of Dowex 2.

In experimental work relative to the present invention, column adsorption tests were carried out employing four commercially available ion exchange resins. Three of these were type I resins; Ionac 641, IRA 430, and Dowex 21-K. In each of these resins, the cationic adsorption sites are provided by methylene trimethylammonium groups. The fourth resin employed in carrying out the experimental work was Ionac A-651, which as described previously is a type II resin in which the cationic adsorption sites are provided by methylene hydroxyethyldimethylammonium groups. The IRA 430 and Dowex 21-K have a gel type physical structure. Ionac 641 and A-651 are macroporous resins which are partially gel and partially macroreticular in structure.

In one suite of experiments, a glass column having a length of 90 centimeters and internal diameter of 1 centimeter was packed with each of the four resins described previously. The lixiviant was passed through the ion exchange column at a flow rate of 9 gallons per minute per square foot of cross-sectional area of the ion exchange resin, equivalent to a volumetric flow rate of about 29 cubic centimeters per minute to provide a residence time of the lixiviant in the column of about three minutes. In one set of experiments, the lixiviant contained about 900 parts per million bicarbonate ion, 2100 ppm sulfate ion, and 597 ppm chloride ion supplied primarily as sodium chloride with minor amounts of calcium and magnesium chloride. The initial uranium concentration of the lixiviant was 90 ppm $U_3O_8$ and the pH was about 7. The results of this set of experiments are set forth in FIG. 1 in which the curves shown are graphs of the leakage of the barren lixiviant effluent from the resin column plotted on the ordinate versus the amount, V, of lixiviant passed through the columns in bed volumes plotted on the abscissa. The leakage, L, is the uranium concentration of the barren lixiviant effluent expressed as a percent of the initial uranium concentration in the pregnant lixiviant applied to the columns. In FIG. 1, the curves 2, 3, 4, and 5 illustrate the resin loadings for Ionac A-651, Ionac 641, IRA 430 and Dowex 21-K, respectively.

A comparative set of experiments was run for the same four resins, employing a carbonate lixiviant having a significantly higher chloride concentration. In this set of experiments, the lixiviant contained 1098 ppm bicarbonate ion, 3149 ppm sulfate ion, and 6163 ppm chloride ion, again added predominantly as sodium chloride with minor amounts of calcium and magnesium chloride. The initial uranium concentration of the pregnant lixiviant for this set of experiments was 82 ppm $U_3O_8$. The pH of the lixiviant was about 7 and the column dimensions and flow rate were the same as in the first set of tests. The results of this second set of tests are set forth in FIG. 2 in which curves 2a, 3a, 4a, and 5a are graphs of the leakage, L, plotted on the ordinate versus the bed volumes, V, of lixiviant passed through the columns plotted on the abscissa for Ionac A-651, Ionac 641, IRA 430 and Dowex 21-K, respectively.

As can be seen from examination of the curves presented in FIG. 1, the loadings of the type I and type II resins for the low salinity lixiviants illustrated in FIG. 1 were roughly comparable. The Ionac A-651, Ionac 641, and IRA 430 all had resin loadings expressed in pounds of $U_3O_8$ per cubic foot of resin of about 1.58 at a leakage of 20%. The resin loading for the Dowex 21-K resin was 1.78 pounds of $U_3O_8$ per cubic foot of resin at a leakage of 20%.

Figure 2:
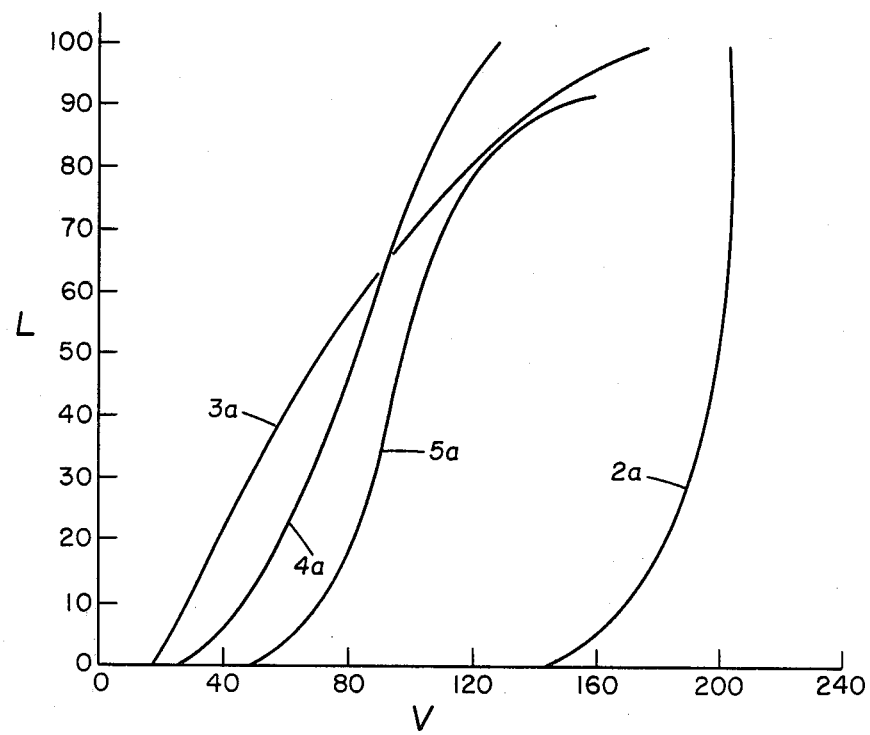
FIG. 2 is a graph illustrating the loading of the ion exchange resins with lixiviants of relatively high chloride ion concentration.

As shown in FIG. 2, the loading characteristics of the type I resins were drastically reduced when the higher salinity lixiviants were employed. Of the three type I resins, the Dowex 21-K had the best loading of 0.41 pound per cubic foot with the IRA 430 and the Ionac 641 exhibiting progressively poorer loadings of 0.30 and 0.19 pound per cubic foot, respectively. The loading for the type II Ionac A-651 as illustrated by curve 2a was significantly better. This resin exhibited a loading factor of 0.93 pound per cubic foot. All of the aforementioned resin loadings were at 20% leakage.

Further experimental work at varying chloride ion concentrations was carried out employing the type I resin, Dowex 21-K, and the type II resin, Ionac A-651. In one suite of experiments, the ion exchange column contained 4 cubic centimeters of resin and the lixiviant was passed through the column at a rate of 0.8 cubic centimeter per minute to provide a residence time of lixiviant in the column of 5 minutes. The lixiviant was formulated from a field brine composed primarily of sodium chloride but having minor amounts of calcium, magnesium, and potassium salts. The chloride concentration of this brine was 3328 ppm or 0.33 weight percent. The initial concentration of the pregnant lixiviant in these tests was 220 ppm $U_3O_8$. The lixiviant contained 450 ppm of bicarbonate ion and had a pH of 7.8. In the column test employing the Dowex 21-K type I resin, the loading factor was 1.36 pounds per cubic foot at 70% leakage and for the type II resin the loading factor was 1.72 pounds per cubic foot, again at a 70% leakage.

Another set of experiments was carried out employing ion exchange columns containing 1 cubic centimeter of type I and type II resins. The type I resin was Dowex 21-K and the type II resin was Ionac A-651. The lixiviant in these tests was passed through the column at a rate of 0.2 cubic centimeter per minute to provide a residence time of 5 minutes. The lixiviants employed in this set of experiments contained sodium chloride, sodium bicarbonate, and minor amounts of calcium and barium salts. The results of this suite of experiments are set forth in Tables I through IV in which the first column gives the bed volumes of lixiviant passed through the column, the second column the leakage in percent, and the third column the resin loading in pounds per cubic foot. For the tests reported in Tables I, III, and IV, the lixiviants contained 1300 ppm bicarbonate ion and were at a pH of 6. For the tests reported in Table II, the lixiviants contained 1300 ppm bicarbonate ion plus 2000 ppm $Na_2CO_3 \cdot H_2O$ and were at a pH of 11.

In Table I, the lixiviant had a chloride ion concentration of 0.54 weight percent. A type I resin was employed in subtables A and B and a type II resin in subtable C. As can be seen from an examination of the data presented in Table I, at this chloride ion concentration, the type II resin had significantly better loading characteristics than the type I resin. At a leakage of only 2%, the loading of the type II resin was generally equivalent to the resin loadings obtained for the type I resin at significantly higher leakages of about 12% to 15%. The low leakage at the early stage of loading for the type II resin is particularly significant since it can be employed to minimize the amount of unrecovered uranium in the barren lixiviant discharged from the last column in the ion exchange system.

The tests of Table II were carried out employing lixiviants also having a chloride ion concentration of 0.54 weight percent but in this case containing sodium carbonate to raise the pH to a value of 11. As can be seen from an examination of this data, the type II resin (subtable 2C) exhibited somewhat better loading characteristics under these pH conditions at leakages of about 40% or less. The column tests reported in Tables III and IV were carried out employing lixiviants having chloride concentrations of 1.19 and 2.19 weight percent, respectively. The type I resin was employed in subtables A and the type II in subtables B. As can be seen from a comparison of Tables III and IV with Table I and FIG. 2, the improved loading characteristics resulting from the use of type II resin are less at these higher salinities than for the intermediate salinities of Table I and FIG. 2. However, even at a chloride concentration of 2.19 weight percent, the use of the type II resin results in somewhat better loading than the type I resin.

TABLE I

| Bed Volume | Leakage, % | Cum. Loading, lb/ft$^3$ |
|---|---|---|
| A - Type I | | |
| 39 | 4.8 | .24 |
| 82 | 8.4 | .49 |
| 109 | 9.9 | .65 |
| 151 | 9.4 | .90 |
| 205 | 12.7 | 1.20 |
| B - Type I | | |
| 37 | 3.9 | .23 |
| 73 | 7.6 | .45 |
| 97 | 11.2 | .58 |
| 134 | 7.5 | .80 |
| 182 | 15.4 | 1.06 |
| C - Type II | | |
| 36 | 0.1 | .23 |
| 73 | 0.2 | .47 |
| 97 | 0.6 | .62 |
| 134 | 1.2 | .86 |
| 181 | 2.1 | 1.16 |

TABLE II

| Bed Volume | Leakage, % | Cum. Loading, lb/ft$^3$ |
|---|---|---|
| A - Type I | | |
| 25 | 3 | .15 |
| 65 | 7 | .39 |
| 126 | 17 | .71 |
| 139 | 28 | .76 |
| 161 | 34 | .86 |
| 203 | 53 | .98 |
| 249 | 70 | 1.07 |
| 264 | 80 | 1.09 |
| 321 | 88 | 1.13 |
| 342 | 92 | 1.14 |
| B - Type I | | |
| 58 | 5 | .35 |
| 102 | 24 | .56 |
| 160 | 44 | .76 |
| C - Type II | | |
| 37 | 0.0 | .24 |
| 75 | 0.5 | .48 |
| 99 | 2 | .64 |
| 138 | 7 | .87 |
| 188 | 36 | 1.08 |
| 232 | 75 | 1.15 |
| 292 | 93 | 1.17 |

TABLE III

| Bed Volume | Leakage, % | Cum. Loading, lb/ft$^3$ |
|---|---|---|
| A - Type I | | |
| 22 | 7 | .17 |
| 54 | 15 | .39 |
| 84 | 16 | .62 |
| 117 | 17 | .85 |
| 158 | 21 | 1.12 |
| 193 | 25 | 1.35 |
| 237 | 23 | 1.64 |
| 269 | 29 | 1.83 |
| 299 | 35 | 1.99 |
| 342 | 30 | 2.25 |
| 398 | 37 | 2.55 |
| B - Type II | | |
| 25 | 2 | .21 |
| 61 | 5 | .51 |
| 93 | 9 | .76 |
| 131 | 10 | 1.06 |
| 171 | 14 | 1.40 |
| 216 | 19 | 1.64 |
| 266 | 18 | 1.99 |
| 303 | 25 | 2.23 |
| 338 | 32 | 2.43 |
| 388 | 32 | 2.72 |
| 452 | 41 | 3.04 |

TABLE IV

| Bed Volume | Leakage, % | Cum. Loading, lb/ft$^3$ |
|---|---|---|
| A - Type I | | |
| 23 | 56 | .09 |
| 56 | 61 | .19 |
| 86 | 59 | .30 |
| 121 | 61 | .41 |
| 163 | 68 | .53 |
| 199 | 71 | .62 |
| 244 | 58 | .78 |
| 277 | 63 | .89 |
| 308 | 65 | .98 |
| 354 | 74 | 1.08 |
| 413 | 79 | 1.18 |
| B - Type II | | |
| 22 | 18 | .15 |
| 54 | 35 | .33 |
| 83 | 44 | .47 |
| 116 | 48 | .62 |
| 156 | 54 | .78 |
| 191 | 63 | .88 |
| 235 | 49 | 1.08 |
| 267 | 52 | 1.20 |
| 297 | 57 | 1.31 |
| 341 | 73 | 1.41 |
| 397 | 73 | 1.54 |

The present invention may be employed in any uranium processing operations in which chloride ions in the pregnant lixiviant inhibit the adsorption of uranyl ions. As disclosed in the aforementioned book by Merritt, the inhibiting effect varies directly with increasing chloride ion concentration, and the use of the type II resin in lixiviants containing chloride ion concentrations of 0.1 weight percent normally can be expected to produce an increase in resin loading of practical significance. A preferred application of the present invention is in the recovery of uranium from lixiviants having chloride ion concentrations of at least 0.5 weight percent since, as indicated by the previously described experimental data, the differential resin loadings between the type I and type II resins are quite pronounced at these salinity levels. Improvements in resin loadings were also observed in lixiviants having chloride ion concentrations of about 1.2 and 2.2 weight percent.

A preferred application of the present invention is in the recovery of uranium from carbonate lixiviants since the inhibiting effect of chloride ions in such lixiviants is more pronounced than in the sulfuric acid lixiviants. The term "carbonate" is meant to include carbonate and bicarbonate ions and mixtures thereof. When employing the present invention to recover uranium from carbonate lixiviants, it is preferred to operate at near neutral pH's of about 5 to 9 since, as indicated by the experimental data presented in Table II, the more strongly alkaline pH levels tend to retard uranium adsorption.

The present invention may be employed in conjunction with any type of leaching operation such as mill leaching, heap leaching, or in-situ leaching. The invention is particularly applicable for use in conjunction with in-situ leaching operations which often involve the use of relatively saline lixiviants. The in-situ leaching procedure may be carried out utilizing injection and production systems as defined by any suitable well arrangement. One suitable well arrangement is a five-spot pattern in which a central injection well is surrounded by four production wells. Other patterns such as seven-spot and nine-spot patterns also may be employed as well as the so-called "line flood" pattern in which injection and production wells are located in generally parallel rows. Typically, the spacing between injection and production wells is on the order of 50 to 200 feet. In some instances, particularly where the subterranean uranium deposit is of a limited areal extent, injection and production may be carried out through the same well. Thus, in relatively thick uranium deposits, dually completed injection-production wells of the type disclosed, for example, in U.S. Pat. No. 2,725,106 to Spearow may be employed. Alternatively, injection of fresh lixiviant and withdrawal of pregnant lixiviant through the same well may be accomplished by a "huff-and puff" procedure employing a well system such as disclosed in U.S. Pat. No. 3,708,206 to Hard et al.

In the in-situ leaching operation, the lixiviant containing suitable oxidants such as hydrogen peroxide or sodium chlorate is introduced into the subterranean uranium body via the injection system. The lixiviant is displaced through a desired portion of the deposit to solubilize uranium values and the pregnant lixiviant is then withdrawn through the production system to the surface. The pregnant lixiviant is then passed through one or more ion exchange columns operated in accordance with any suitable procedure. For example, the ion exchange columns may be operated in the "fixed bed" mode or in the "moving bed" mode as described in the aforementioned book by Merritt at page 167, et seq. The barren lixiviant from the ion exchange column is then circulated to a blending zone where suitable complexing and oxidizing agents are added to regenerate fresh lixiviant. The fresh lixiviant is then introduced into the subterranean ore body. The ion exchange column may be eluted by any suitable techniques such as described, for example, in the aforementioned book by Merritt at pages 156-163 and the resultant eluant then treated to recover the uranium. Macroporous type II resins such as the Ionac A-651, IRA 910, and Duolite 102D resins described previously are preferred since they exhibit lower leakages during loading than the gel type resins. A suitable eluant for use with the carbonate lixiviants described previously is a one molar solution of sodium chloride containing 0.5 weight percent each of sodium carbonate and sodium bicarbonate.

I claim:

1. In a method for the recovery of uranium from a pregnant lixiviant by contacting an anionic ion exchange resin with said lixiviant to adsorb uranium therefrom and wherein said lixiviant contains chloride ions which inhibit the adsorption of uranyl ions, the improvement comprising employing an anionic ion exchange resin having cationic adsorption sites provided by quaternary ammonium groups having a hydroxyalkyl group as a quaternizing substituent.

2. The method of claim 1 wherein said lixiviant has a chloride ion concentration of at least 0.1 weight percent.

3. The method of claim 1 wherein said lixiviant has a chloride ion concentration of at least 0.5 weight percent.

4. The method of claim 1 wherein said cationic adsorption sites are provided by methylene hydroxyalkyl dimethyl ammonium groups wherein said hydroxyalkyl group contains 1 or 2 carbon atoms.

5. The method of claim 1 wherein said cationic adsorption sites are provided by methylene hydroxyethyldimethylammonium groups.

6. The method of claim 1 wherein said lixiviant is a carbonate lixiviant having a pH within the range of 5 to 9.

* * * * *